(12) United States Patent
Kim

(10) Patent No.: US 8,947,210 B2
(45) Date of Patent: Feb. 3, 2015

(54) NEAR FIELD RADIO FREQUENCY COMMUNICATION SYSTEM

(75) Inventor: Nam Yun Kim, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 649 days.

(21) Appl. No.: 12/740,712

(22) PCT Filed: Nov. 21, 2008

(86) PCT No.: PCT/KR2008/006867
§ 371 (c)(1),
(2), (4) Date: Apr. 30, 2010

(87) PCT Pub. No.: WO2009/066951
PCT Pub. Date: May 28, 2009

(65) Prior Publication Data
US 2010/0245054 A1     Sep. 30, 2010

(30) Foreign Application Priority Data

Nov. 21, 2007   (KR) .................. 10-2007-0118882

(51) Int. Cl.
*H04Q 5/22*       (2006.01)
*G08B 13/14*     (2006.01)
(Continued)

(52) U.S. Cl.
CPC .......... *H04B 5/0062* (2013.01); *G06K 7/10336* (2013.01); *H04B 7/0604* (2013.01)
USPC ....... 340/10.4; 340/10.1; 340/10.2; 340/10.3; 340/572.1

(58) Field of Classification Search
CPC .................. G06K 7/0008; G06K 19/0723
USPC ............................. 340/10.1–10.4
See application file for complete search history.

(56) References Cited

U.S. PATENT DOCUMENTS 5,621,411 A      4/1997   Hagl et al.
6,127,917 A  *  10/2000   Tuttle .......................... 340/10.1
(Continued)

FOREIGN PATENT DOCUMENTS

EP       1610258 A1    12/2005
EP       1758256 A1    2/2007
(Continued)

OTHER PUBLICATIONS

Office Action dated May 8, 2012 in Japanese Application No. 2010-534890, filed Nov. 21, 2008.
(Continued)

*Primary Examiner* — Daniel Wu
*Assistant Examiner* — Mohamed Barakat
(74) *Attorney, Agent, or Firm* — Saliwanchik, Lloyd & Eisenschenk

(57) ABSTRACT

Disclosed is a near field radio frequency communication system. The near field radio frequency communication system comprising: a master RFID/USN device which comprises a plurality of antennas to sequentially shower an energy signal through the antennas; and a slave RFID/USN device which generates a first power using the energy signal, detects a power level of the first power, and transmits information created based on the power level to the master RFID/USN device, wherein the master RFID/USN device creates a first position information of the slave RFID/USN device related to a direction by determining an antenna used to communicate with the slave RFID/USN device, and a second position information of the slave RFID/USN device related to a distance using the information created based on the power level.

12 Claims, 4 Drawing Sheets

(51) Int. Cl.
*H04B 5/00* (2006.01)
*G06K 7/10* (2006.01)
*H04B 7/06* (2006.01)

(56) References Cited

U.S. PATENT DOCUMENTS

| | | | |
|---|---|---|---|
| 6,473,028 B1 | 10/2002 | Luc | |
| 6,483,427 B1* | 11/2002 | Werb | 340/10.1 |
| 6,614,387 B1* | 9/2003 | Deadman | 342/70 |
| 6,903,656 B1* | 6/2005 | Lee | 340/572.1 |
| 7,265,675 B1* | 9/2007 | Carrender et al. | 340/572.7 |
| 7,310,070 B1* | 12/2007 | Hardman et al. | 343/742 |
| 7,357,299 B2* | 4/2008 | Frerking | 235/375 |
| 7,573,418 B2* | 8/2009 | Kawai et al. | 342/42 |
| 7,872,581 B2* | 1/2011 | Darianian et al. | 340/572.1 |
| 2002/0008633 A1* | 1/2002 | Heller | 340/825.53 |
| 2005/0280538 A1* | 12/2005 | Kawai et al. | 340/572.1 |
| 2007/0069864 A1 | 3/2007 | Bae et al. | |
| 2007/0125837 A1 | 6/2007 | Park et al. | |
| 2007/0262849 A1* | 11/2007 | Ismail | 340/10.1 |
| 2008/0252426 A1* | 10/2008 | Lee et al. | 340/10.3 |

FOREIGN PATENT DOCUMENTS

| | | |
|---|---|---|
| JP | 08-005731 A | 1/1996 |
| JP | 2000-346934 A | 12/2000 |
| JP | 2004-294338 A | 10/2004 |
| JP | 2005-303402 A | 10/2005 |
| JP | 2006-090726 A | 4/2006 |
| JP | 2006-238398 A | 9/2006 |
| WO | WO-01/06401 A1 | 1/2001 |
| WO | WO 0106401 A1 * | 1/2001 |
| WO | WO-01/22118 A2 | 3/2001 |

OTHER PUBLICATIONS

Supplementary European Search Report dated Oct. 16, 2012 in European Application No. 20080852418, filed Nov. 21, 2008.

* cited by examiner

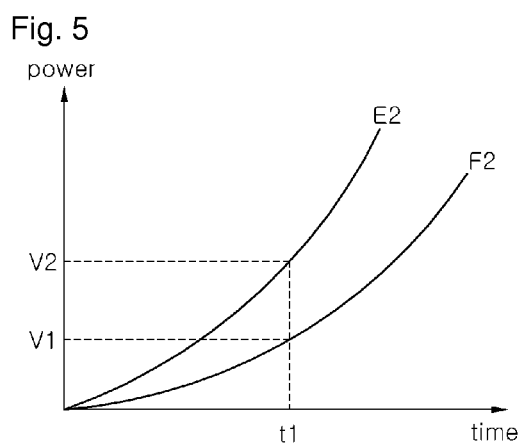

NEAR FIELD RADIO FREQUENCY COMMUNICATION SYSTEM

CROSS-REFERENCE TO RELATED APPLICATIONS

This application is the U.S. national stage application of International Patent Application No. PCT/KR2008/006867, filed Nov. 21, 2008, which claims priority to Korean Application No. 10-2007-0118882, filed Nov. 21, 2007, the disclosures of each of which are incorporated herein by reference in their entirety.

TECHNICAL FIELD

The present embodiment relates to a near field radio frequency communication system.

BACKGROUND ART

Ubiquitous network technologies representatively comprise a radio frequency identification (RFID) technology or a ZigBee technology.

In an RFID network, a reader or an access point (AP) periodically transmits an information request signal. A tag entering a coverage area of the reader transmits tag information according to the information request signal of the reader. The reader checks the tag information received from the tag to communicate with the tag.

In such an RFID network, the reader can determine only if the tag exists in the coverage area of the reader according to the response of the tag, but cannot accurately detect position information of the tag. Accordingly, the reader periodically transmits the information request signal to the tag regardless of the existence of the tag. Therefore, power may be wasted.

In addition, the reader cannot select the tag that is the other party of communication. Accordingly, when the tag exists in a coverage area of the reader, the reader may unnecessarily communicate with the tag.

DISCLOSURE OF INVENTION

Technical Problem

The embodiment provides a near field radio frequency communication system, which enables a reader or an access point (AP) to accurately detect the position of a tag.

The embodiment also provides a near field radio frequency communication system capable of preventing system power from being wasted.

Technical Solution

According to the embodiment, a near field radio frequency communication system comprising: a master RFID/USN device which comprises a plurality of antennas to sequentially shower an energy signal through the antennas; and a slave RFID/USN device which generates a first power using the energy signal, detects a power level of the first power, and transmits a information created based on the power level to the master RFID/USN device, wherein the master RFID/USN device creates a first position information of the slave RFID/USN device related to a direction by determining an antenna used to communicate with the slave RFID/USN device, and a second position information of the slave RFID/USN device related to a distance using the information created based on the power level.

Advantageous Effects

As described above, a near field radio frequency communication system according to the embodiments enables a reader or an access point (AP) to accurately detect a position of a tag, and can prevent power from being wasted.

BRIEF DESCRIPTION OF THE DRAWINGS

FIG. 5 is a graph showing power based on energy signals according to distances in a slave RFID/USN device according to the embodiment.

MODE FOR THE INVENTION

Hereinafter, a near field radio frequency communication system according to an embodiment will be described in detail with reference to accompanying drawings.

Figure 1:
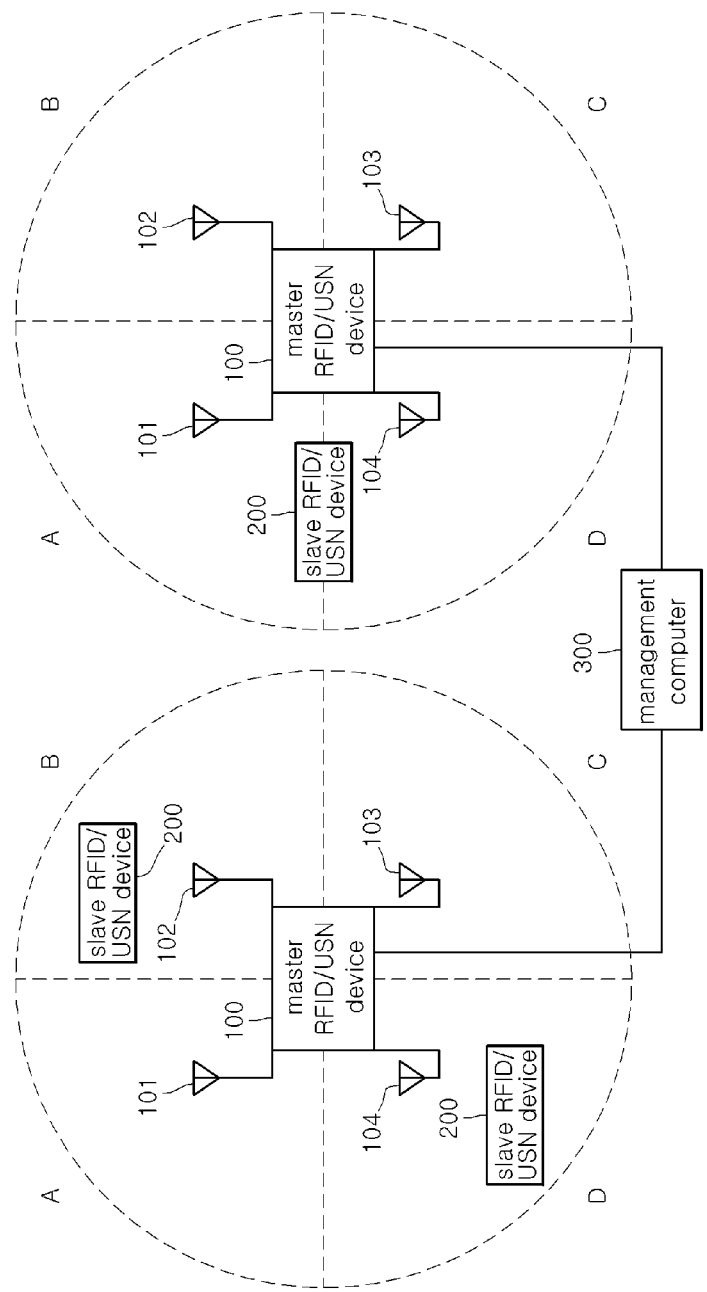
FIG. 1 is a control block diagram showing a near field radio frequency communication system according to the embodiment.

FIG. 1 is a control block diagram showing a near field radio frequency communication system according to the embodiment.

The near field radio frequency communication system according to the embodiment can be realized by using an RFID transceiver employing a channel with a 900 MHz band or a ZigBee transceiver employing a channel with a 2.4 GHz band.

When the near field radio frequency communication system according to the embodiment is realized by using the RFID transceiver, a master radio frequency identification (RFID)/ubiquitous sensor network (USN) device 100 may be an RFID/USN reader, and a slave RFID/USN device 200 may be an active RFID tag or a sensor node.

When the near field radio frequency communication system according to the embodiment is realized by using the ZigBee transceiver, the slave RFID/USN device 200 may be a tag realized by using a reduced function device (RFD), and the master RFID/USN device 100 may be an access point (AP) realized by using a full function device (FFD) or a personal area network coordinator (PAN coordinator). The FFD module may communicate with other FFD modules or both of the FFD modules and RFD modules in order to construct a network having various topologies. The RFD module is a ZigBee module that cannot serve as a coordinator. An FFD module equipped with a network initialization function, a node function or a node management function to enable other ZigBee modules to form the network is referred to as a PAN coordinator module.

As shown in FIG. 1, the near field radio frequency communication system according to the embodiment comprises the master RFID/USN device 100, the slave RFID/USN device 200, and a management computer 300.

The master RFID/USN device 100 can receive tag information from the slave RFID/USN device 200 to deliver the tag information to the management computer 300. A plurality of master RFID/USN devices 100 are installed in each coverage area. For example, when the master RFID/USN devices 100 are realized as a reader-type AP in a building, the master RFID/USN devices 100 may be mounted on a ceiling of the building in the form of a matrix with an interval of several meters. Accordingly, the position of the slave RFID/USN device 200 that has transmitted the tag information can be traced based on an installation position of the master RFID/USN device 200 that has received the tag information.

The slave RFID/USN device 200 has mobility and may be attached to an article or carried by a person in the form of a tag.

The management computer 300 can represent the positions of the master RFID/USN devices 100 installed in the form of a matrix as coordinates, and match the position of the slave RFID/USN device 200 traced by the master RFID/USN device 100 with the coordinates. Hereinafter, the coordinates of the master RFID/USN device 100 will be referred to as reader coordinate information, and the coordinates of the slave RFID/USN device 200 matched on the reader coordinate information will be referred to as tag coordinate information. Accordingly, the management computer 300 maps the tag coordinate information on a map to analyze the position of the slave RFID/USN device 200.

In addition, the master RFID/USN device 100 divides a coverage area thereof, and comprises a plurality of antennas 101, 102, 103, and 104 corresponding to the divided areas. The antennas 101, 102, 103, and 104 form radiation patterns having a predetermined direction, and the radiation patterns of the antennas 101, 102, 103, and 104 must be not overlapped with each other. Accordingly, the number of antennas belonging to one master RFID/USN device 100 may be adjusted according to the above condition.

The master RFID/USN device 100 including the antennas 101, 102, 103, and 104 sequentially transmit energy signals through the antennas 101, 102, 103, and 104, called a carrier shower scheme.

Accordingly, the position of the slave RFID/USN device 200 driven in a wake-up mode by receiving an energy signal of the master RFID/USN device 100 can be discriminated by the antennas 101, 102, 103, and 104. Therefore, the master RFID/USN device 100 can precisely detect the position of the slave RFID/USN device 200 communicating therewith according to sub-divided antenna areas A, B, C, and D.

Meanwhile, the salve RFID/USN device 200 can detect a power level of an energy signal that has transmitted through the carrier shower scheme to determine, based on the power level, if it is positioned in the coverage area of the master RID/USN device 100 or has a waiting state in the vicinity of the coverage area.

If the power level of the energy signal exceeds a reference value, the slave RFID/USN device 200 operates in a wake-up mode by using an additional power supply to transmit tag identification information and tag information of the slave RFID/USN device 200 to the master RFID/USN device 100. Accordingly, the master RFID/USN device 100 can identify the salve RFID/USN device 200 existing in the coverage area of the master RFID/USN device 100.

If the power level of the energy signal is less than the reference value, the slave RFID/USN device 200 operates in a sleep mode to transmit waiting state information to the master RFID/USN device 100, in which the waiting state information represents that the slave RFID/USN device 200 has a waiting state. Accordingly, the master RFID/USN device 100 can detect the salve RFID/USN device 200 in the waiting state in the vicinity of the coverage area of the master RFID/USN device 100.

Hereinafter, for the purpose of explanation, position information of the slave RFID/USN device 200 according to areas of the antennas 101, 102, 103, and 104 is referred to as first position information, and measurable position information of the slave RFID/USN device 200 according to the intensity of an energy signal is referred to second position information.

As described above, the position of the slave RFID/USN device 200 can be traced by using the tag coordinate information matched with the reader coordinate information, the first position information, and the second position information.

The tag coordinate information represents position information about the slave RFID/USN device 200 that can be indirectly analyzed based on the position of the master RFID/USN device 100 communicating with the slave RFID/USN device 200.

The first position information may represent information related to a direction in areas divided of the antennas 101, 102, 103, and 104 of the master RFID/USN device 100.

The second position information may represent information related to a distance between the master RFID/USN device 100 and the slave RFID/USN device 200 based on the distance of the coverage area.

Accordingly, the first and second position information may form one vector. The position of the slave RFID/USN device 200 can be traced in more detail through the combination of the first and second position information and the tag coordinate information.

Hereinafter, the tag coordinate information, the first position information, and the second position information will be generally referred to as tag position information.

The master RFID/USN device 100 communicates with another master RFID/USN device 100 to share tag information and tag position information with another master RFID/USN device 100. Accordingly, the master RFID/USN device 100 previously detects the movement of the slave RFID/USN device 200 to smoothly make communication with the slave RFID/USN device 200.

The management computer 300 is connected to the plural master RFID/USN devices 100 to collect tag position information and tag information to control the master RFID/USN device 100 and the slave RFID/USN device 200. In addition, the management computer 300 collects statistics for the tag information and the tag position information to provide the statistics to a manager through a user interface.

The master RFID/USN device 100 selects the salve RFID/USN device 200 positioned in the coverage area to wake-up the slave RFID/USN device 200. Accordingly, the slave RFID/USN device 200 can operate in a wake-up mode to make communication with the master RFID/USN device 100. In this case, if the master RFID/USN device 100 first communicates with the slave RFID/USN device 200, the master RFID/USN device 100 allots wake-up selection information to the slave RFID/USN device 200, and transmits the assigned wake-up selection information to the slave RFID/USN device 100.

When transmitting an energy signal through the carrier shower scheme, the master RFID/USN device 100 can transmit the wake-up selection information together with the energy signal in real time. The wake-up selection information comprises appliance identification information and command information used to indicate operation in a wake-up mode.

The slave RFID/USN device 200 stores the wake-up selection information and transmits information representing that it has successfully processed the wake-up selection information to the master RFID/USN device 100.

Subsequently, the master RFID/USN device 100 identifies the slave RFID/USN device 200, and records a fact that the wake-up selection information is stored in the slave RFID/USN device 100.

Thereafter, the master RFID/USN device 100 trying to communicate with the slave RFID/USN device 200 can transmit wake-up selection information of the slave RFID/USN device 200 together with an energy signal through the carrier shower scheme.

The slave RFID/USN device 200 that has received the wake-up selection information and the energy signal can process the wake-up selection information by using the energy signal as power used to switch into a wake-up mode.

Figure 2:
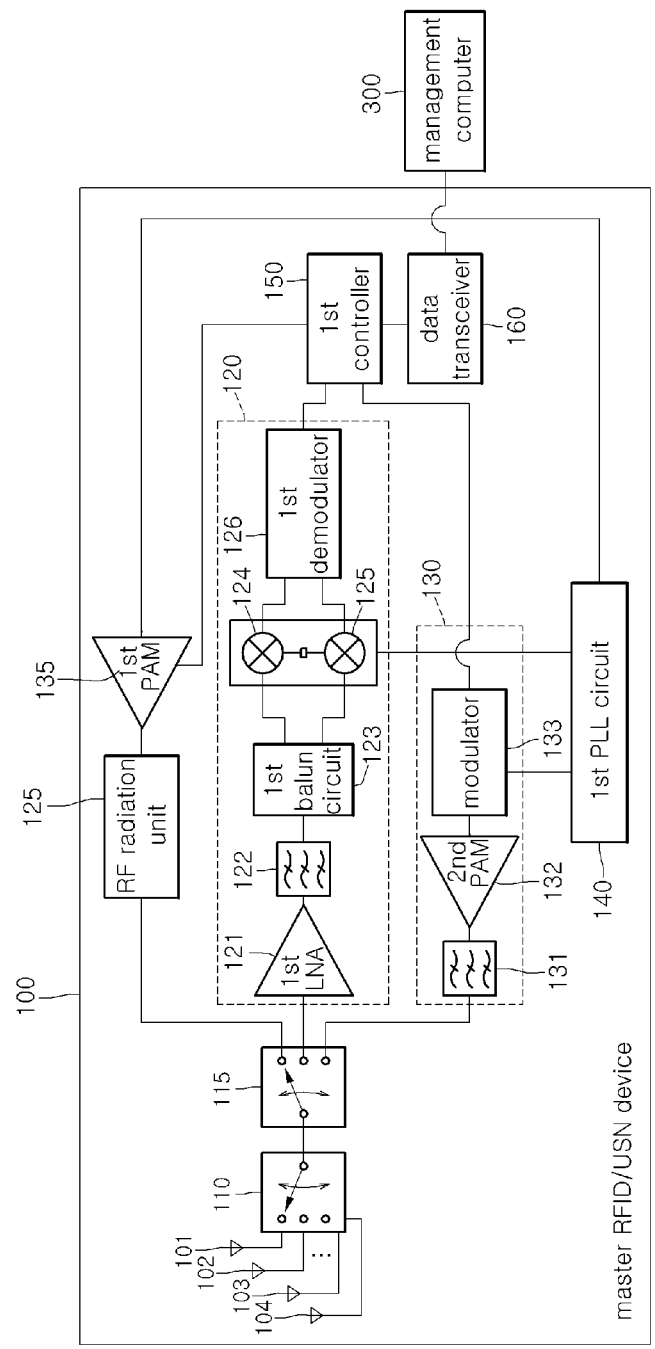
FIG. 2 is a control block diagram showing a master RFID/USN device in a near field radio frequency communication system according to the embodiment.

FIG. 2 is a control block diagram showing the master RFID/USN device 100 in a near field radio frequency communication system according to the embodiment.

As shown in FIG. 2, the master RFID/USN device 100 comprises the first to fourth antennas 101 to 104, a first signal splitter 110, a second signal splitter 115, an RF radiation unit 125, a first power amplifier module (PAM) 135, a first receive signal processing unit 120, a first transmit signal processing unit 130, a first controller 150, a data transceiver 160, and a first phase lock loop circuit 140.

The first receive signal processing unit 120 comprises a first low noise amplifier (LNA) 121, a first filter 122, a first balun circuit 123, a first mixer 124, a second mixer 125, and a first demodulator 126. The first transmit signal processing unit 130 comprises a second filter 131, a second PAM 132, and a modulator 133.

The master RFID/USN device 100 divides a coverage area thereof and comprises a plurality of antennas. According to an embodiment, the master RFID/USN device 100 comprises four antennas.

The first to fourth antennas 101 to 104 cover first to fourth quadrants of the coverage area, respectively, to transmit/receive signals. The first to fourth antennas 101 to 104 can transmit/receive signals containing communication data (e.g., tag information, wake-up selection information, first position information, and second information) and energy signals. The first to fourth antennas 101 to 104 may have the form of a patch antenna.

The first and second signal splitters 110 and 115 receive control voltage from the first controller 150 to selectively establish a signal path. The first signal splitter 110 sequentially establishes signal paths for the first to fourth antennas 101 to 104. The second signal splitter 115 selectively establishes a signal path to the RF radiation unit 125, the first receive signal processing unit 120, and the first transmit signal processing unit 130. The first and second signal splitters 110 and 115 may be realized by using semiconductor switching elements.

Hereinafter, processing transmit/receive signals through the first and second signal splitters 110 and 115 will be described. Hereinafter, the slave RFID/USN device 200 will be referred to as a tag, and the master RFID/USN device 100 will be referred to as an AP.

When the position of the tag 200 is traced, the second signal splitter 115 connects the RF radiation unit 125 with the first signal splitter 110, and the first signal splitter 110 sequentially connects the first to fourth antennas 101 to 104 to the second signal splitter 115.

An energy signal generated from the RF radiation unit 125 is sequentially showered to four sub-division areas of the coverage area through the first to fourth antennas 101 to 104 by way of the second signal splitter 115 and the first signal splitter 110.

After the energy signal is transmitted through one of the first to fourth antennas 101 to 104, the second signal splitter 115 establishes a signal path to the first receive signal processing unit 120, so that it is determined if a predetermined signal is received from the tag 200 existing in an area of the antenna.

When the signal path of the first signal splitter 110 is switched to the first to fourth antennas 101, 102, 103, and 104, a branch operation of the second signal splitter 115 can be repeated.

When the tag 200 transmits waiting state information, or tag identification information and tag information according to a power level of the energy signal, the information received in the AP 100 from the tag 200 is processed in the first receive signal processing unit 120.

The first controller 150 analyzes a switching state of the first signal splitter 110 to determine an antenna that has received the information from the tag 200 among the first to fourth antennas 101 to 104. Then, the first controller 150 creates first position information obtained by analyzing the position of a quadrant of the coverage area in which the tag 200 is placed.

When receiving tag identification information and tag information, the first controller 150 creates second position information representing that the tag 200 is positioned in a coverage area within few meters from the AP 100.

The first controller 150 decodes tag identification information and tag information delivered from the first demodulator 126 into a digital signal. In addition, the first controller 150 forms a transmit signal by using control data (related to a tag operation) and tag command data (e.g., information request) and delivers the transmit signal to the modulator 133.

The first controller 150 controls the first signal splitter 110 to exclude the first to fourth antennas 101 to 104 that have been used for communication with the tag 200, and switches into remaining antenna paths such that an energy signal can be showered.

When receiving the waiting state information from the tag 200, the first controller 150 creates second position information representing that the tag 200 is positioned in the vicinity of the coverage area. In this case, the first controller 150 forms a signal containing the first position information, the second position information, AP identification information thereof, and tag identification information, and then transmits the signal to an adjacent AP 100.

Accordingly, the adjacent AP 100 estimates the position of the tag 200 to perform the switching operation and the signal processing operation described above. Accordingly, the adjacent AP 100 can communicate with the tag 200 positioned in a coverage area thereof.

The signal containing the first position information, the second position information, the AP identification information, and the tag identification information is delivered to the management computer 300 through the data transceiver 160, and the management computer 300 analyzes the above information to create tag position information.

The management computer 300 identifies the AP 100 that has transmitted the signal and creates tag coordinate information, which is matched with reader coordinate information of the AP 100, according to the AP identification information. In addition, the management computer 300 creates more accurate tag position information in combination of the first position information and the second position information.

The management computer 300 searches for the AP 100 installed in a place most adjacent to the tag 200, and transmits the tag identification information and the tag position information to the AP 100. Accordingly, the AP 100 that has received the tag identification information and the tag position information performs the antenna switching operation and the signal processing operation to communicate with the tag 200 positioned in the coverage area thereof.

The management computer 300 analyzes tag position information, a moving path, and tag information to store the information in a database, so that the information can be used for various services. For example, when the near field radio frequency communication system according to an embodiment is installed in a large-scale discount store, the management computer 300 can analyze customer preference and a popular article section based on the information stored in the database.

The data transceiver 160 may be connected to the management computer 300 through a wireless network such as the Wi-Fi, the ultra wide band (UWB), the world interoperability for microwave access (WiMax), and the discarded short range communication (DSRC) or a cable network including a universal asynchronous receiver/transmitter (UART), the Internet (employing TCP/IP), a switch hub, AND a serial/parallel cable.

When the AP 100 tries to select one among tags 200, positions of which are detected, and communicate with the selected tag 200, the first controller 150 forms a transmit signal using wake-up selection information (e.g., wake-up ID), and transmits the transmit signal to the first transmit signal processing unit 130.

The first transmit signal processing unit 130 transmits the transmit signal processed to an RF signal to the first to fourth antennas 101 to 104 through the second and first signal splitters 115 and 110.

The tag 200 stores wake-up selection information received from the AP 100.

Thereafter, the first controller 150 extracts wake-up selection information of the tag 200 for communication, from plural pieces of wake-up selection information of tags 100 stored in a memory and then transmits the wake-up selection information to the first PAM 135. Then, the first PAM 135 amplifies the wake-up selection information of the tag 200 to a signal having a transmittable size and transmits the amplified signal the RF radiation unit 125.

The RF radiation unit 125 comprises at least one of a modulator, a gain amplifier, an envelop detector, and an integration circuit, and converts an oscillation signal supplied from the first phase lock loop circuit 140 into an energy signal.

Since the energy signal must be suitable for an RFID signal standard, the first controller 150 transmits power level information to the first PAM 135, and the first PAM 135 amplifies the oscillation signal transmitted from the first phase lock loop circuit 140 to a signal having a predetermined level.

When a carrier shower is performed in order to trace the position of the tag 200, the RF radiation unit 125 may generate only an energy signal. In addition, when the tag 200 is selected to wake-up, the RF radiation unit 125 may combine wake-up selection information of the tag 200 and an energy signal into a single signal.

The tag 200 operating in a sleep mode receives an energy signal combined with wake-up selection information and analyzes the wake-up selection information to switch into a wake-up mode from the sleep mode. The tag 200 in the wake-up mode communicates with the AP 100.

The first receive signal processing unit 120 will be described below.

When receiving a signal from the second signal splitter 115, the first LNA 121 suppresses a noise component as much as possible to amplify the signal, and the first filter 122 filters the noise component when the signal is low-noise amplified.

The first balun circuit 123 extracts an I signal (e.g., "E sin($\varpi t$)") and a Q signal (e.g., "E cos($\varpi t$)") from the filtered signal.

An output terminal of the first balun circuit 123 is connected to the first mixer 124 and the second mixer 125 forming a dual mixer. The first mixer 124 synthesizes I base band signals ($I^+$ signal and $I^-$ signal) having a phase difference of 90 degrees by mixing the oscillation signal of the first phase lock loop circuit 140 with the I signal, and the second mixer 125 synthesizes Q base band signals ($Q^+$ signal and $Q^-$ signal) having a phase difference of 90 degrees by mixing the oscillation signal with the Q signal.

The first demodulator 126 comprises an analog to digital converter (ADC) to demodulate the I and Q base band signals into a digital signal having a plurality of polarities.

The first transmit signal processing unit 130 will be described below.

The modulator 133 synthesizes a digital transmit signal received from the first controller 150 with an oscillation signal received from the first phase lock loop circuit 140 to modulate the digital transmit signal into an analog transmit signal. At this time, the modulator 133 employs a direct sequence spread spectrum (DSSS) scheme. The modulator 133 can perform modulation according to the IEEE 802.15.4, the IEEE 802.15.4a, the IEEE 802.154b, and the IEEE 802.15.5 for communication between sensor nodes, the USIS and the Sensor ML for resource management and a data format, and the IEEE 1451 for a sensor interface.

The second PAM 132 amplifies a transmit signal such that the transmit signal can be output. Thereafter, a spurious signal is removed from the transmit signal when the transmit signal passes through the second filter 131, and then delivered to the second signal splitter 115.

Figure 3:
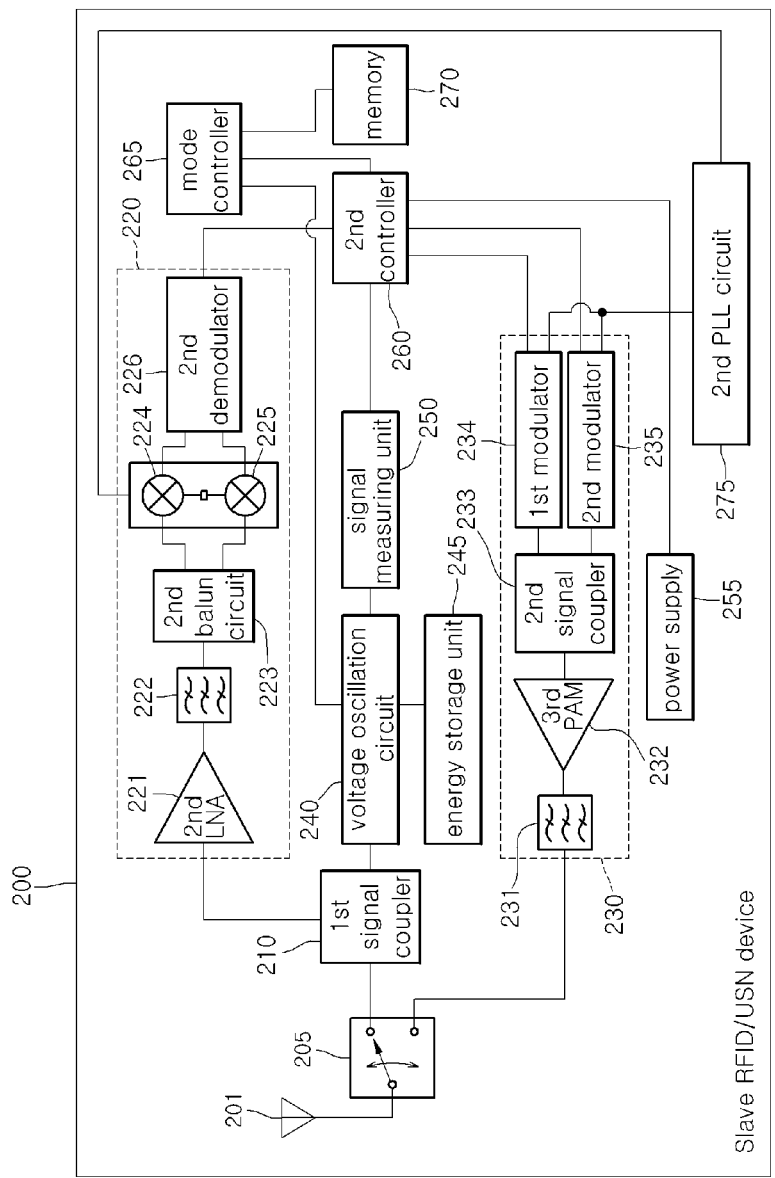
FIG. 3 is a control block diagram showing a slave RFID/USN device in a near field radio frequency communication system according to the embodiment.

FIG. 3 is a control block diagram showing the slave RFID/USN device 200 in the near field radio frequency communication system.

As shown in FIG. 3, the slave RFID/USN device 200 according to an embodiment comprises a fifth antenna 201, a third signal splitter 205, a first signal coupler 210, a voltage oscillation circuit 240, an energy storage unit 245, a signal measuring unit 250, a second controller 260, a mode controller 265, a memory 270, a second receive signal processing unit 220, a second transmit signal processing unit 230, a power supply 255, and a second phase lock loop circuit 275.

The second receive signal processing unit 220 comprises a second low noise amplifier 221, a third filter 222, a second balun circuit 223, a third mixer 224, a fourth mixer 225, and a second demodulator 226, and the second transmit signal processing unit 230 comprises a fourth filter 231, a third power amplifier module 232, a second signal coupler 233, a first modulator 234, and a second modulator 235.

Since the second receive signal processing unit 220 and the second transmit signal processing unit 230 have a structure and an operation similar to those of the first receive signal processing unit 120 and the first transmit signal processing unit 130 except for the type of processed signals, therefore the description for the repeated part will be omitted.

When receiving an energy signal through the fifth antenna 201, the third signal splitter 205 switches a signal path to the first signal coupler 210, and the first signal coupler 210 couples the energy signal and transmits the energy signal to the voltage oscillation circuit 240.

The third signal splitter 205 delivers a transmit signal and a receive signal, separately. The receive signal is delivered to the first signal coupler 210, and the transmit signal from the second transmit signal processing unit 230 is delivered to the fifth antenna 201. For example, the first signal coupler 210 may be realized by using a coupling capacitor or a directional coupler.

The voltage oscillation circuit 240 generates first power using propagation energy of an energy signal. The voltage oscillation circuit 240 may comprise a plurality of tuning diodes and a plurality of capacitors, which are connected to each other in a multiple-stage, to sequentially rectify RF signals received from the fifth antenna 201 into DC voltage while raising the DC voltage.

The first power having a modulation waveform of a predetermined voltage level is stored in the energy storage unit 245 to be used as operational power of the mode controller 265. In this case, the energy storage unit 245 may be realized by using a relatively large capacitor.

The first power is delivered to the first modulator 234, and a first analog signal processed in the first modulator 234 is contained in the modulation waveform of the first power as a response code. The transmit signal is transmitted through a backscatter scheme.

The first modulator 234 modulates a digital transmit signal into a first analog signal. For example, the first analog signal may be generated through a direct sequence spread spectrum (DSSS) scheme. The first modulator 234 may be realized by using a rectifier, a low-pass filter, and a level detector.

The signal measuring unit 250 detects a power level of an energy signal, and transmits the detected signal to the second controller 260. In detail, the signal measuring unit 250 outputs a high-frequency energy signal as a DC voltage signal proportional to a dB value, thereby expanding a sensitivity range of a signal having a receivable power level. In other words, such a signal measuring unit 250 may be realized by using a log amplifier to output the energy signal, which is coupled in the form of an analog signal, as the DC voltage signal to generate the detected signal.

Figure 4:
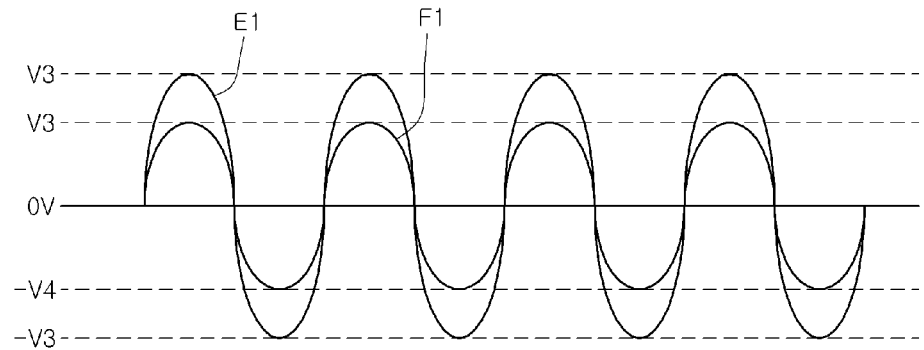
FIG. 4 is a graph showing energy signals according to distances received in a slave RFID/USN device according to the embodiment.

FIG. 4 is a graph showing energy signals according to distances received in the RFID/USN device 200 according to one embodiment, and FIG. 5 is a graph showing power generated based on energy signals according to distances in the RFID/USN device 200 according to one embodiment.

As shown in FIG. 4, an energy signal E1 having a voltage level of V4 to V4 is received in the tag 200 when the tag 200 is positioned in a coverage area of the AP 100, and an energy signal F1 having a voltage level of V3 to V3 is received in the tag 200 when the tag 200 is positioned outside the coverage area of the AP 100.

For example, the V4 may have a voltage level greater than 20 mV, and the V3 may have a voltage level less than 20 mV.

Thus, since the intensity of an energy signal is varied according to positions of the tag 200, the intensity of the first power generated from the voltage oscillation circuit 240 for a predetermined time t1 is changed as shown in FIG. 5.

When the first power E2 is generated using the energy signal E1, the first power E2 has a voltage intensity of V2 for a predetermined time t1. In addition, when the first power F2 is generated using the energy signal F1, the first power F2 has the voltage intensity of V1 less than a voltage intensity of V2.

The voltage oscillation circuit 240 generates the first power by raising voltage of an energy signal for the time t1.

The second controller 260 compares the first power with a reference value. If the first power is greater than the reference value, the second controller 260 switches into a wake-up mode by operating the power supply 255 and transmits tag identification information and tag information to the AP 100 to make communication. The reference value may be V1 of about 2.1V. If the first power is less than the reference value, the second controller 260 creates waiting state information and transmits the waiting state information to the AP 100.

After transmitting the waiting state information, the second controller 260 switches into a sleep mode without operating the power supply 255. The power supply 255 comprises a battery or a voltage regulator, and supplies second power to each component of the tag 200.

The second modulator 235 modulates a digital transmit signal into a second analog signal. The second analog signal may be generated based on a quadrature phase shift keying (QPSK) scheme. The second modulator 235 comprises at least one of a plurality of mixers, a plurality of adders, or a plurality of orthogonal signal converters, and converts a transmit signal into a signal combining four signals (I+, I−, Q+, and Q−) by changing the phase of the transmit signal by 90 degrees.

The second phase lock loop circuit 275 supplies an oscillation signal necessary for signal modulation or signal mixing to the first modulator 234, the second modulator 235, the third mixer 224, or the fourth mixer 225. The second signal coupler 233 couples transmit signals, which are processed in the first and second modulators 234 and 235, through one line and then delivers the transmit signals to the third power amplifier module 232.

Meanwhile, when wake-up selection information is received, an energy signal or a reader signal having the wake-up selection information is delivered to the second receive signal processing unit 220 through the first signal coupler 210.

The energy signal or the reader signal delivered to the second receive signal processing unit 220 is demodulated into a digital signal and then delivered to the second controller 260.

The second controller 260 encodes the wake-up selection information by analyzing the digital signal and then delivers the wake-up selection information to the mode controller 265.

The mode controller 265 manages the wake-up selection information by storing the wake-up selection information in the memory 270.

Thereafter, the second controller 260 generates a response code representing that wake-up selection information is successfully recognized and forms a transmit signal using the response code. Then, the second controller 260 transmits the transmit signal to the AP 100.

When the response code is not received or wake-up selection information is changed, the AP 100 can periodically transmit a reader signal including the wake-up selection information.

The wake-up selection information may be contained in an energy signal and then transmitted through a carrier shower scheme, or may be transmitted in the form of a reader signal.

According to one embodiment, the sleep mode represents that components of the tag 200 are stopped except for the mode controller 265 driven by the first power. The wake-up mode represents that the power supply 255 operates, a control authority of the mode controller 265 is transferred to the second controller 260, and remaining components are operating by the second power.

When the AP 100 transmits wake-up selection information of the tag 200 together with an energy signal in order to activate the tag 200 requiring communication, the voltage oscillation circuit 240 generates the first power and supplies the first power to the second receive signal process unit 220 and the mode controller 265 in the sleep mode.

The second receive signal processing unit 220 demodulates wake-up selection information and delivers the wake-up selection information to the mode controller 265, and the mode controller 265 compares wake-up selection information stored in the memory 270 with the wake-up selection information delivered from the second receive signal processing unit 220. If the two pieces of the wake-up selection information are identical to each other, the mode controller 265 recognizes that the AP 100 requests communication, and operates the power supply 255 to supply the second power to remaining components including the second controller 260. In other words, the tag 200 operates in a wake-up mode by the wake-up selection information of the AP 100.

The second controller 260 that has received a control authority from the mode controller 265 controls each component, and processes an RFID communication protocol to communicate with the AP 100.

The second controller 260 that has switched into the wake-up mode generates a response code reporting that communication is possible and delivers the response code to the AP 100 together with tag identification information.

When receiving an information request signal from the AP 100, the second controller 260 transmits tag information and tag identification information to the AP 100.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive. The above disclosed subject matter is to be considered illustrative, and not restrictive, and the appended claims are intended to cover all such modifications, enhancements, and other embodiments, which fall within the true spirit and scope of the present invention.

INDUSTRIAL APPLICABILITY

The present invention is applicable to a near field radio frequency communication system.

The invention claimed is:

1. A near field radio frequency communication system comprising:
   a master RFID/ubiquitous sensor network (USN) device comprising a plurality of antennas sequentially transmitting an energy signal and dividing a coverage area of the master RFID/USN device into a plurality of areas respectively corresponding to the plurality of antennas; and
   a slave RFID/USN device comprising a voltage oscillation circuit for generating a first power using the transmitted energy signal, and a controller for detecting a power level of the first power for the energy signal and for transmitting information created based on the power level to the master RFID/USN device,
   wherein the master RFID/USN device receives the information from the slave RFID/USD device through one of the plurality of antennas, creates a first position information representing one of the divided areas corresponding to the one of the plurality of antennas, creates a second position information representing whether the slave RFID/USN device is positioned in the one of the divided areas and determined by the information,
   wherein a position of the slave RFID/USN device is determined by tag position information that is a combination of the first position information, the second position information, and tag coordinate information that is matched with reader coordinate information that is a coordinate information of the master RFID/USN device,
   wherein the information comprises a tag identification information and a tag information, or a waiting state information, and wherein the slave RFID/USN device operates in a wake-up mode by driving a power supply to transmit the tag identification information and the tag information if the power level of the first power exceeds a reference value, and operates in a sleep mode to transmit the waiting state information if the power level of the first power is less than or equal to the reference value, and
   wherein the master RFID/USN device creates the second position information representing that the slave RFID/USN device is positioned in the one of the divided areas when the tag identification information and the tag information are received, and creates the second position information representing that the slave RFID/USN device is positioned outside the one of the divided areas when the waiting state information is received.

2. The near field radio frequency communication system of claim 1, comprising a management computer which creates a tag position information by receiving the first and second position information from the master RFID/USN device and by the tag coordinate information, stores the tag position information in a database by statistically processing the tag position information, and transmits the tag identification information and the tag position information to another master RFID/USN device.

3. The near field radio frequency communication system of claim 2, wherein a plurality of the master RFID/USN devices are provided, and the management computer creates the reader coordinate information based on positions of the master RFID/USN devices, and creates the tag coordinate information by matching a position of the slave RFID/USN device, which communicates with the master RFID/USN device, with the reader coordinate information.

4. The near field radio frequency communication system of claim 1, wherein the master RFID/USN device transmits the first and second position information and a tag identification information to another master RFID/USN device such that the other master RFID/USN device communicates with the slave RFID/USN device.

5. The near field radio frequency communication system of claim 1, wherein the master RFID/USN device transmits a wake-up selection information to the slave RFID/USN device, the wake-up selection information being used to activate an operation of the slave RFID/USN device, and
   the slave RFID/USN device stores the wake-up selection information in a memory when the wake-up selection information is first received.

6. The near field radio frequency communication system of claim 1, wherein the slave RFID/USN device further comprises:
   a memory which stores a first wake-up selection information; and
   a mode controller which operates by the first power, and compares a second wake-up selection information received from the master RFID/USN device with the first wake-up selection information stored in the memory to operate a power supply when the second wake-up selection information is identical to the first wakeup selection information, thereby transmitting the second wake-up selection information to the controller which operates in the wake-up mode.

7. The near field radio frequency communication system of claim 6, wherein the slave RFID/USN device creates a first response code reporting that the first wake-up selection information is successfully received and stored in the memory, and transmits the first response code to the master RFID/USN device.

8. The near field radio frequency communication system of claim 7, wherein the slave RFID/USN device creates a second response code reporting that the second wake-up selection information is received, and the slave RFID/USN device operates in the wake-up mode to transmit the second response code to the master RFID/USN device, and the master RFID/USN device transmits an information request signal to the slave RFID/USN device to make RFID communication when the second response code is received.

9. The near field radio frequency communication system of claim 6, wherein master RFID/USN device transmits the second wake-up selection information together with the energy signal, and the slave RFID/USN device comprises a voltage oscillator which creates the first power based on the energy signal and delivers the first power to the mode controller.

10. The near field radio frequency communication system of claim 1, wherein the master RFID/USN device further comprises:

a first phase lock loop circuit which generates an oscillation signal;

a first receive signal processing unit which processes a receive signal by using the oscillation signal;

a first transmit signal processing unit which processes a transmit signal by using the oscillation signal;

an RF radiation unit which generates the energy signal by using the oscillation signal;

a first signal splitter which switches the antennas; and a second signal splitter which switches the first signal splitter to one of the first receive signal processing unit, the first transmit signal processing unit, and the RF radiation unit.

11. The near field radio frequency communication system of claim 1, wherein the slave RFID/USN device further comprises:

a signal splitter for branching signal paths of the antennas;

a receive signal processing unit electrically connected to the signal splitter to process a receive signal;

a transmit signal processing unit electrically connected to the signal splitter to process a transmit signal; and a voltage oscillator electrically connected to the signal splitter to convert the energy signal to the first power.

12. The near field radio frequency communication system of claim 1, wherein the master RFID/USN device comprises at least one of an RFID/USN reader, a router, and a coordinator, and the slave RFID/USN device comprises at least one of an RFID tag and a sensor node.

* * * * *